United States Patent [19]

Stumler

[11] Patent Number: 5,788,120
[45] Date of Patent: Aug. 4, 1998

[54] SPOUT FOR A FROZEN DESSERT BAG

[75] Inventor: Irvin H. Stumler, Louisville, Ky.

[73] Assignee: Europex Systems, Inc., Louisville, Ky.

[21] Appl. No.: 749,097

[22] Filed: Nov. 14, 1996

[51] Int. Cl.⁶ ............................................... B65D 35/28
[52] U.S. Cl. ..................................... 222/95; 222/105
[58] Field of Search .................... 222/92, 95, 96, 222/105, 107, 326, 386, 387, 386.5, 389

[56] References Cited

U.S. PATENT DOCUMENTS

| | | | |
|---|---|---|---|
| D. 359,683 | 6/1995 | Beach | D9/434 |
| 1,996,792 | 6/1935 | Bystricky et al. | |
| 3,552,607 | 1/1971 | Edwards | |
| 4,170,316 | 10/1979 | LaBarbera | |
| 4,213,545 | 7/1980 | Thompson et al. | 222/386.5 |
| 4,998,990 | 3/1991 | Richter et al. | 222/105 X |
| 5,069,364 | 12/1991 | McGill | 222/95 |
| 5,127,550 | 7/1992 | Knorr | |
| 5,147,071 | 9/1992 | Rutter et al. | 222/105 X |
| 5,405,054 | 4/1995 | Thomas | 222/105 X |
| 5,421,484 | 6/1995 | Beach | 222/96 X |
| 5,492,249 | 2/1996 | Beach | 222/105 X |
| 5,505,336 | 4/1996 | Montgomery et al. | 222/326 X |
| 5,647,511 | 7/1997 | Bond | 222/107 X |

FOREIGN PATENT DOCUMENTS

| | | |
|---|---|---|
| 0 138 620 A | 4/1985 | European Pat. Off. |
| 0 598 255 A | 5/1994 | European Pat. Off. |
| WO 90 05697 A | 5/1990 | WIPO |

*Primary Examiner*—Kevin P. Shaver
*Attorney, Agent, or Firm*—Wheat, Camoriano Smith & Beres PLC

[57] ABSTRACT

A bag for a frozen dessert dispenser includes a spout which has a tab which projects down into the bag to ensure that the bag does not cover the outlet opening. The spout also includes an indentation which mates with a projection on the dispenser to ensure that the tab is properly oriented in the dispenser.

7 Claims, 2 Drawing Sheets

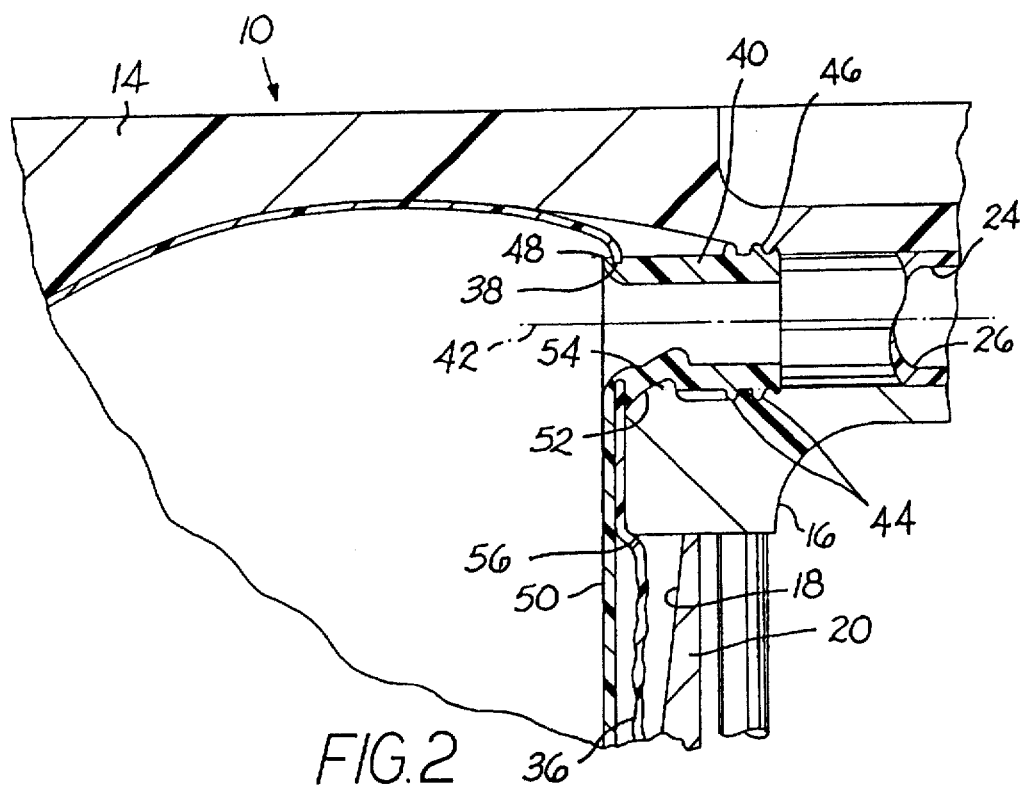
FIG. 2
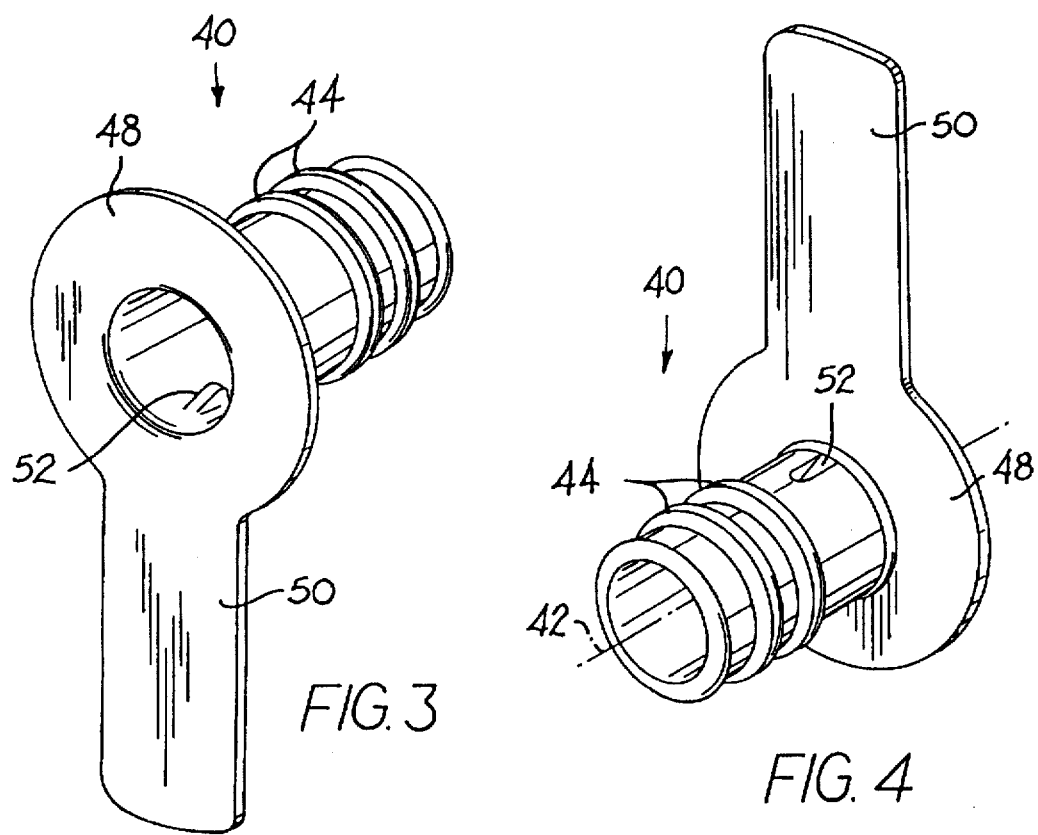
FIG. 3
FIG. 4

SPOUT FOR A FROZEN DESSERT BAG

BACKGROUND OF THE INVENTION

Frozen dessert dispensers which use flexible bags to hold the frozen dessert are known, as shown in U.S. Pat. No. 5,421,484 "Beach". These dispensers provide an efficient, sanitary way to hold and dispense frozen desserts. However, some problems remain with these dispensers.

In a dispenser as taught in the "Beach" patent, the frozen dessert is squeezed out of the spout by pushing against the bag with a piston. When the dispenser stops dispensing, the piston is released and may fall back down. Also, when the door is opened to replace an empty bag, the pistons are released for all the bags, which again may allow all the pistons to fall down. Whenever the piston moves down, the frozen dessert in the flexible bag also may fall down to the bottom of the bag, leaving a void in the top portion of the bag. When the piston again pushes against the bottom of the bag to squeeze out more frozen dessert, the empty top portion of the bag may deform. In many cases, the empty top portion deforms so as to partially or completely cover the opening of the bag through which the frozen dessert must pass. Then, as the piston pushes against the bottom of the bag, the dessert cannot squeeze out through the opening, and the dispenser malfunctions.

SUMMARY OF THE INVENTION

The purpose of the present invention is to solve the problem described above. The present invention provides a tab on the spout of the flexible bag which projects downwardly from the spout, preventing the flexible bag from deforming, and thereby preventing the bag from closing off the opening.

The present invention also provides an indentation on the spout and a mating projection on the dispenser which ensure that the tab is properly oriented in the dispenser when the bag is installed in the dispenser.

BRIEF DESCRIPTION OF THE DRAWINGS

FIG. 2 is an enlarged, broken-away portion of the dispenser of FIG. 1, showing the spout portion;

FIG. 3 is a perspective view of the spout of FIGS. 1 and 2;

FIG. 4 is a bottom perspective view of the spout of FIGS. 1 and 2; and

DESCRIPTION OF THE PREFERRED EMBODIMENT

Figures 1, 5:
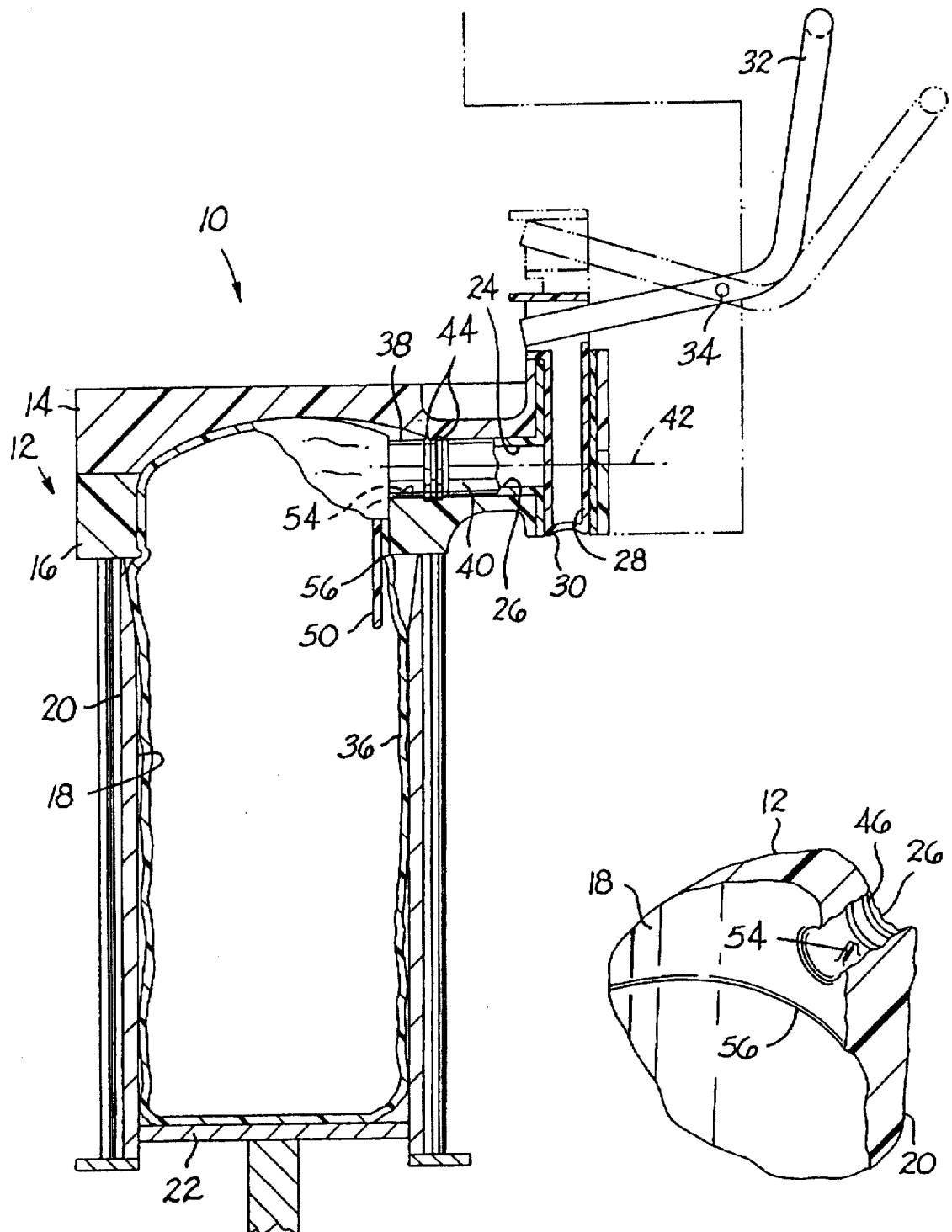
FIG. 1 is a side sectional view of a dispenser made in accordance with the present invention.
FIG. 5 is a broken-away perspective view of the inside of the housing in the area of the spout.

FIG. 1 is a side sectional view showing one example of a dispenser 10, made in accordance with the present invention. The dispenser 10 includes a housing 12, which is made up of two pieces 14, 16, which are fastened together to form an interior 18 and an exterior 20. There is a piston 22, located in the interior 18 of the housing 12 for squeezing frozen dessert out of the dispenser. At the upper end of the housing 12 is a passage 24 from the interior 18 to the exterior 20 through which frozen dessert passes to leave the dispenser 10. In this embodiment, the passage 24 includes a horizontal portion 26 and a vertical portion 28. A valve member 30 slides up and down in the vertical portion 28 to open and close the passage 24. The valve member 30 is operated by a handle 32, which pivots about a pivot point 34, formed from a pin which passes through a hole in the handle 32 and which is fixed to the machine.

As is well known in the art, the entire apparatus shown in FIG. 1 is preferably located inside a refrigerated cabinet, except the handle 32 and the outer opening of the passage 24. This is made clear by showing the upper part of the cabinet in phantom in FIG. 1. As is also well known in the art, the manual movement of the handle 32 up and down not only controls the valve member 30 to open and close the passage 24, but it also controls the movement of the piston 22, so that the piston 22 is pushing upwardly, squeezing product out of the dispenser 10 when the handle 32 is pushed down, opening the passage 24, and the piston 22 is released and allowed to drop back down when the handle 32 is pivoted upwardly, closing the passage 24.

The piston 22 is preferably operated by using air pressure to push the piston upwardly and then relieving the air pressure when frozen dessert is not to be dispensed.

Inside the interior 18 of the housing 12 is a flexible plastic bag 36, which is impermeable to water. The bag 36 has a cylindrical shape, which corresponds to the cylindrical shape of the interior 18. Near the top of the bag 36, at the side wall of the bag 36 is an opening 38. A spout 40 is welded to the bag 36 at the opening 38, so that the only way frozen dessert can leave the bag 36 is through the spout 40. The spout 40 has an outside diameter which corresponds to the inside diameter of the horizontal portion 26 of the passage 24, so that, when the top and bottom parts 14, 16 of the housing 12 are put together, the spout 40 is received in the passage 26 with a snug fit.

The spout 40 is cylindrical, and has an axis 42. The spout 40 also has two annular projections 44 in its outer surface which are received in annular indentations 46 in the passage 26 to properly locate the spout axially in the passage 24.

FIGS. 3 and 4 show the spout 40 in more detail. The spout 40 has a flange 48 at its first end, which provides a surface onto which the bag 36 is welded. There is also an elongated tab 50 projecting downwardly from the flange 48. In this preferred embodiment, the tab 50 extends down from the outside surface of the spout 40, substantially perpendicularly to the axis of the spout, a distance which is greater than two times the outside diameter of the spout. It is expected that the tab 50 should extend down at least the distance of one outside diameter beyond the spout in order to prevent the bag 36 from folding up on itself and closing off the opening 38.

FIGS. 3 and 4 show that the spout 40 has an indentation 52 in its outer surface at the bottom of the spout at the first end of the spout. The indentation 52 is tapered so that, at the first end of the spout 40, it is at the outside diameter of the spout, and, then, as it extends toward the second end of the spout 40, the indentation 52 gets deeper, until there is a sharp step at the other end of the indentation.

FIG. 5 shows that there is a corresponding wedge-shaped projection 54 on the bottom of the passage 26, and FIGS. 1 and 2 show how the indentation 52 receives the projection 54 to ensure that the tab 50 is properly oriented in the dispenser, pointing downwardly to prevent the bag 36 from folding over the opening 38. If the spout 40 is not properly oriented, with the wedge projection 54 received in the indentation 52 of the spout, then the two pieces 14, 16 of the housing 12 will not close properly, because the housing fits snugly around the spout 40 when the housing is closed.

As shown in FIGS. 1 and 2, the tab 50 is directed straight down, so it does not interfere with the movement of frozen dessert out of the bag 36 and through the opening 38. Once the piston 22 reaches the tab 50, the tab 50 flexes inwardly, to lie more parallel to the axis 42 of the spout, as the last of the frozen dessert is squeezed out of the spout 40. The piston 22 stops at the annular indentation 56 in the cylindrical housing 12, so the tab 50 is not pushed any further than that.

It will be obvious to those skilled in the art that modifications may be made to the embodiment described above without departing from the scope of the present invention.

What is claimed is:

1. A bag for a frozen dessert dispenser, comprising:

an elongated, flexible, watertight bag having an upper end and a lower end and defining an opening near its upper end;

a spout fixed to said bag at said opening, said spout including a tubular spout body defining an axis, an inside diameter, an outside diameter, an outer surface, an inner surface, and first and second ends; at least one annular projection from the outer surface of said tubular spout body; and an elongated tab projecting outwardly from said spout body at the first end of said spout body inside said bag, said elongated tab extending substantially perpendicularly to the axis of said tubular spout body for a distance at least as long as the outside diameter of said spout body.

2. A bag for a frozen dessert machine as recited in claim 1, wherein said tab extends downwardly from the bottom side of said spout, and further comprising an indentation on the bottom side of the outer surface of said tubular spout body.

3. A bag for a frozen dessert machine as recited in claim 2, wherein said indentation is tapered so that, at the first end it is level with the outside diameter of the spout body and, as it progresses toward the first end of the spout, it is indented a substantial distance from the outside diameter of the spout body, forming a step.

4. A frozen dessert dispenser, comprising:

a housing, including an upper portion and a lower portion, which are fastened together to define an interior and an exterior, and a passage from said interior to the exterior at one end of said interior;

a piston which moves along said interior to squeeze frozen dessert out of the interior through the passage;

a flexible bag inside said interior, said flexible bag including an opening and a spout in said opening, said spout lying in said passage, said spout having an axis and defining an exterior annular ring, and said passage defining an annular recess which receives said annular ring;

said spout including an elongated tab which projects into the bag for a distance at least as long as the diameter of said spout in a direction substantially perpendicular to said axis.

5. A frozen dessert dispenser as recited in claim 4, wherein said passage includes a projection, which extends over only a portion of the circumference of the passage, and said spout includes a corresponding indentation which mates with the projection in order to ensure that said tab is properly oriented in said dispenser.

6. A spout for a bag for a frozen dessert dispenser, comprising:

a tubular body defining an external diameter, an internal diameter, an axis, an internal surface and an external surface and first and second ends;

at least one projection on said external surface;

a flange on said tubular body at said first end, and a tab projecting from said flange substantially perpendicularly to said axis, so that said tab extends from the external surface of said tubular body at least the distance of the external diameter from said tubular body.

7. A spout for a bag as recited in claim 6, and further comprising an indentation in the external surface of said tubular body which is adapted to mate with a corresponding projection on the dispenser in order to ensure that the tab is properly oriented in the dispenser.

* * * * *